G. H. CORLISS.
Fly-Wheel.

No. 215,805.  Patented May 27, 1879.

Witnesses:
E. B. Bolton
W. Colborne Brookes

Inventor:
Geo. H. Corliss
by his attorney
Thomas D. Stetson

N. PETERS, PHOTO-LITHOGRAPHER, WASHINGTON, D. C.

UNITED STATES PATENT OFFICE.

GEORGE H. CORLISS, OF PROVIDENCE, RHODE ISLAND.

IMPROVEMENT IN FLY-WHEELS.

Specification forming part of Letters Patent No. 215,805, dated May 27, 1879; application filed January 2, 1879.

*To all whom it may concern:*

Be it known that I, GEORGE H. CORLISS, of Providence, in the State of Rhode Island, have invented certain new and useful improvements relating to the construction of pulleys and other wheels of large diameter; and I do hereby declare that the following is a full and exact description thereof.

Whenever plain fly-wheels, pulleys, or gears are of such dimensions that for convenience in handling and transportation, or to secure exemption from the injurious effects of "shrinkage strains," it is found necessary to make each arm thereof in a separate casting, the usual practice has been to make the hub or central part in one piece and fit the several arms into it. I have made an improvement upon that system by dispensing entirely with the hub or center as a separate piece, and so form the inner extremities of the arms themselves that when joined together on the shaft in the peculiar manner herein described they shall constitute a complete counterpart of the hub or center. In constructing a wheel of six arms I so form them that they each shall cover one-sixth of the circumference of the shaft. If eight arms are required, each shall cover one-eighth of the circumference of the shaft, and so on to any number of arms. From the shaft the arms extend outward in fan-shaped form. The lines of separation between the arms are radial, and upon these lines flanges are raised to receive the bolts which hold the several arms together.

By this arrangement I am able to obtain the requisite strength with reduced weight of metal as compared with the usual method of construction, and also secure important advantages of convenience in mounting the wheel upon the shaft. A keyway is made in one or more of the arms to fit a key let into the shaft in the ordinary manner.

The accompanying drawings form a part of this specification, and represent what I consider the best means of carrying out the invention.

Figure 1:
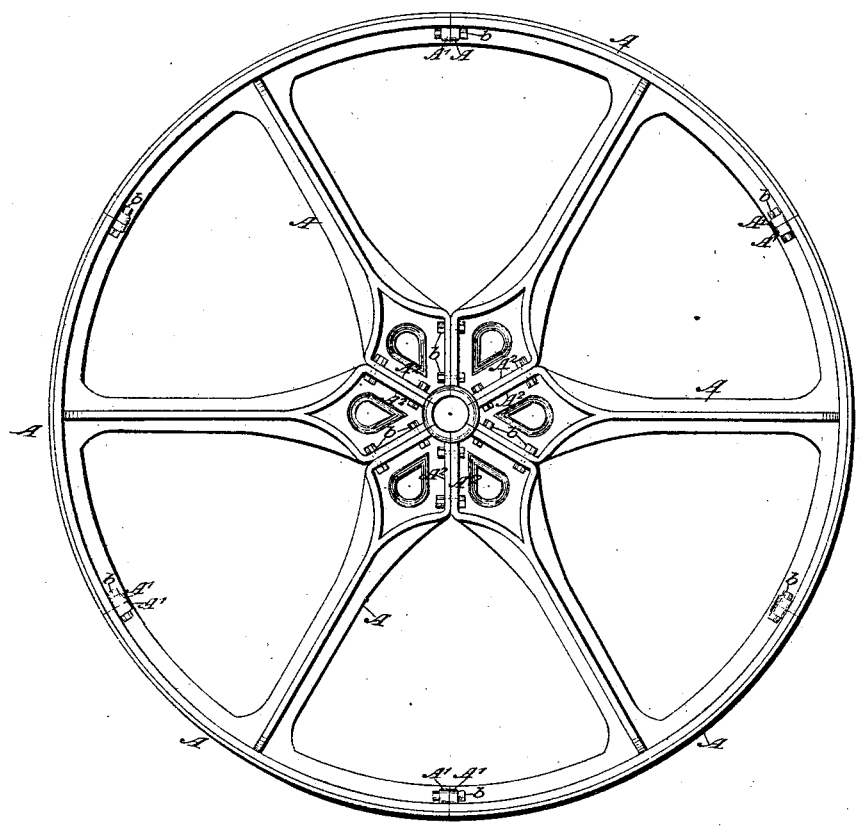
Figure 2:

Figure 1 is a side elevation of the entire wheel. Fig. 2 is an edge view of one-half.

Similar letters of reference indicate like parts in both the figures.

A A A A A A are six pieces, which are all cast from the same pattern. Each is provided with flanges $A^1$ $A^1$ at the junction of the section at the periphery, and with flanges $A^2$ $A^2$ at the junction near the center. Bolts $b\ b\ b\ b$ are inserted in these flanges, and hold the parts firmly together. The parts are so formed at the center as to give a suitable bearing on the shaft.

I prefer to cast the rim and arm in one piece, as represented, thereby saving the labor of fitting the two together.

I do not attach special importance to the means of fastening together the sections of the rim. I prefer the means shown.

My flanges $A^2$ take hold near the shaft. My line of flanges $A^2$ stretch on each face of the wheel quite down to the surface of the shaft. The arrangement allows the wheel to be united more forcibly and reliably than when simply engaged by the flanges $A^1$.

I claim as my invention—

A fly-wheel or pulley made in sections A, secured together by bolts $b$, applied through a flange, $A^2$, on each face of the wheel, which extends radially along each line of juncture of the parts and joins them close to the shaft, substantially as herein specified.

In testimony whereof I have hereunto set my hand this 19th day of December, 1878, in the presence of two subscribing witnesses.

GEO. H. CORLISS.

Witnesses:
JESSE WALRATH,
GEO. W. KENNEDY.